(12) United States Patent
Hamming et al.

(10) Patent No.: US 6,637,691 B1
(45) Date of Patent: Oct. 28, 2003

(54) LATCHING MECHANISM FOR TAPE DRIVE

(75) Inventors: John Anthony Hamming, Laguna Niguel, CA (US); Robert Ralph Heinze, San Clemente, CA (US); Scott Louis Hanson, Costa Mesa, CA (US); Kempton William Redhead, Huntington Beach, CA (US); Walter Fehlmann, Fountain Valley, CA (US); Russell Allen Bauer, Garden Grove, CA (US); Turguy Goker, Solana Beach, CA (US)

(73) Assignee: Seagate Removable Storage Solutions, LLC, Scotts Valley, CA (US)

( * ) Notice: Subject to any disclaimer, the term of this patent is extended or adjusted under 35 U.S.C. 154(b) by 43 days.

(21) Appl. No.: 09/864,282

(22) Filed: May 25, 2001

Related U.S. Application Data

(60) Provisional application No. 60/207,889, filed on May 25, 2000.

(51) Int. Cl.[7] ................................................. G11B 15/66
(52) U.S. Cl. ...................................... 242/332.8; 360/95
(58) Field of Search .......................... 242/332.8, 532.6, 242/587, 587.1, 587.2; 360/95

(56) References Cited

U.S. PATENT DOCUMENTS

6,034,839 A 3/2000 Hamming .................... 360/95

*Primary Examiner*—John Q. Nguyen
(74) *Attorney, Agent, or Firm*—McDermott, Will & Emery (57) ABSTRACT

A method and apparatus for loading tape from a single reel tape cartridge into a take-up reel. The hub filler is securely and releaseably attached to the take-up reel upon the hub filler entering the take-up reel. This attachment provides adequate securement between the hub filler and the take-up reel for the tape to be wrapped around the take-up reel during loading of the tape without the hub filler partially ejecting from the take-up reel. By preventing the hub filler from partially ejecting from the take-up reel, damage to the tape and the tape drive loading mechanism is mitigated. Upon unloading of the tape from the tape drive, the hub filler can be readily released from its attachment to the take-up reel.

20 Claims, 6 Drawing Sheets

LATCHING MECHANISM FOR TAPE DRIVE

CROSS-REFERENCE TO RELATED APPLICATIONS

This application claims priority from provisional patent application Ser. No. 60/207,889, filed May 25, 2000, which is incorporated herein by reference.

FIELD OF THE INVENTION

The present invention relates to a method and apparatus for releaseably attaching a hub filler to a take-up reel to prevent deformation of an attached tape.

DESCRIPTION OF RELATED ART

Single reel tape cartridges are used to transport and store tape for reelto-reel tape drives. A single reel tape cartridge is inserted into a tape drive and a mechanism is used to load the end of the tape into a take-up reel from the tape cartridge. Once the end of the tape is loaded into the take-up reel, the tape drive operates as a reel-to-reel tape drive. A motor is coupled to the take-up reel to rotate the take-up reel about the take-up reel axis and another motor is coupled to the single reel tape cartridge to rotate the reel of the tape cartridge about its axis.

The tape drive loading mechanism attaches to a tape leader pin, located at the end of the tape contained in the single reel tape cartridge. The hub filler uses a slot in the hub filler for receiving the tape leader pin. The hub filler is coupled to a guide arm that drives the hub filler between the single reel tape cartridge and the take-up reel. An example of a mechanism for driving the hub filler between the tape cartridge and the take-up reel is disclosed in U.S. Pat. No. 6,034,839.

Figure 1:
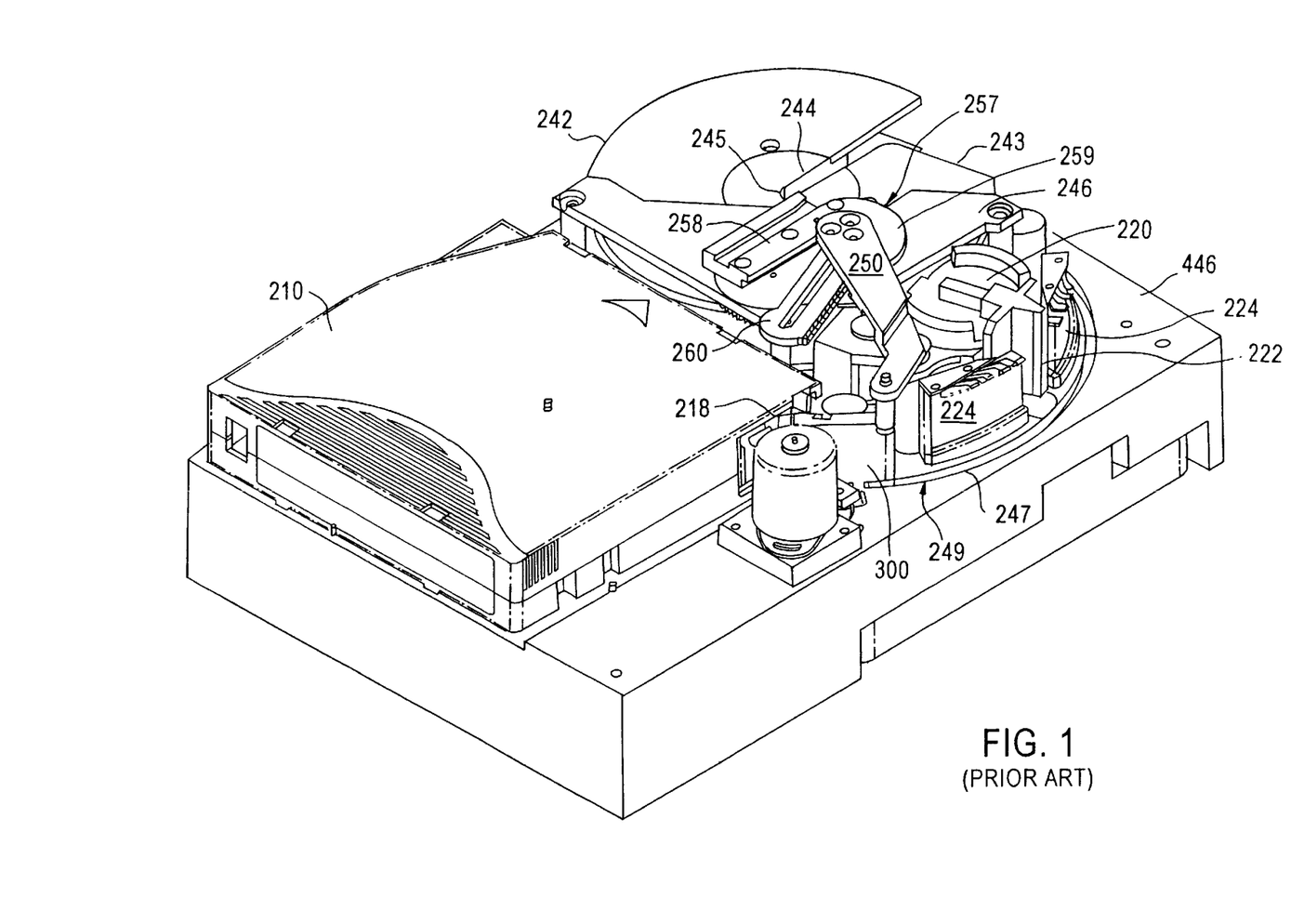
FIG. 1 is a view of a tape drive loading mechanism of the prior art.

FIG. 1 is a view of the tape drive loading mechanism disclosed in U.S. Pat. No. 6,034,839. The hub filler 300 enters into the cartridge 210 and attaches to the end of the tape. The hub filler 300 then moves along a guide rail 247, driven by the guide arm 250. Typically, the hub filler 300 attaches to the end of a tape in the tape cartridge 210 and the guide arm 250 moves the hub filler 300 along the guide rail 247, trailing the tape across the read/write head 222 and into the take-up reel 242. The hub filler 300 enters the take-up reel 242 through a channel 244 and into the hub 245 of the take-up reel 242.

Figure 2:
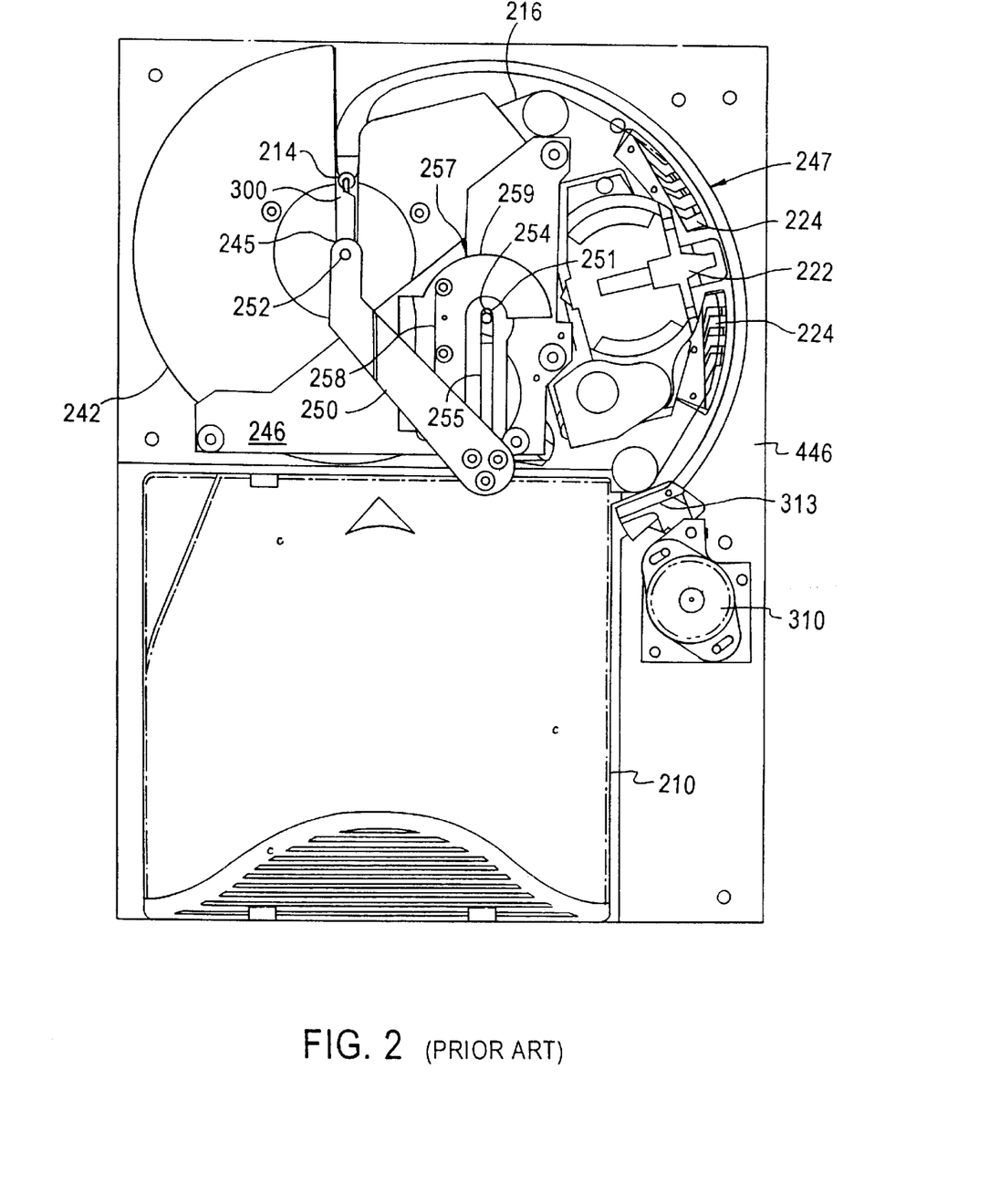
FIG. 2 is a top view of a tape drive loading mechanism of the prior art.

FIG. 2 is a top view of the tape drive, depicting the hub filler 300 in the take-up reel 242 with the tape 216 attached. The tape 216 passes across the read/write head 222 and the end of the tape 216 is secured to the take-up reel 242. The tape drive is then operated by rotation of the take-up reel 242 and the single reel of the cartridge 210 about their respective axes to move the tape 216 across the read/write head 222. Motors are used to rotate the take-up reel 242 and the single reel of the cartridge 210, controlling the speed of the tape 216 as it moves across the read/write head 222. The hub filler 300 pivots on an axle 252 that is coupled to the guide arm 250. This pivoting is necessary for the hub filler 300 to be guided on the guide rail 247 into the take-up reel 242. Once the hub filler 300 is in the take-up reel 242, with the tape 216 attached, the take-up reel 242 rotates to thereby unload the tape from the cartridge 210. The hub filler 300 rotates with the take-up reel 242 on the axle 252. The loading mechanism attempts to align the axle 252 axis and the takeup reel 242 axis perfectly.

Figure 3:
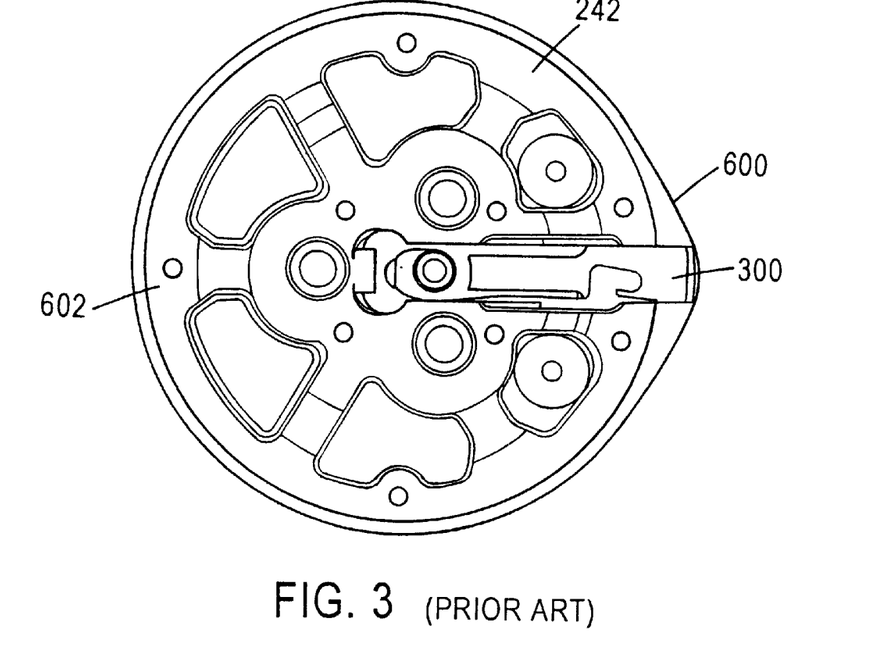
FIGS. 3 and 4 are views of a hub filler of the prior art partially ejected from a take-up reel, as tape is wrapped around the take-up reel.

FIG. 3 is a top perspective view of the hub filler 300 partially ejected from take-up reel 242. It is shown that tape 600 is wrapped around the take-up reel 242 with a partially ejected hub filler 300. The partially ejected hub filler 300 prevents the tape 600 from wrapping on the circumference 602 of the take-up reel 242. As the tape 600 is progressively wrapped around the take-up reel 242 with the partially ejected hub filler 300, the partially ejected position of the hub filler 300 is maintained. This is due to both the pressure from the end of the tape 600 attached to the hub filler 300 and the force of the tape 600 on the hub filler 300 as it is wrapped around the take-up reel 242.

Figure 4:
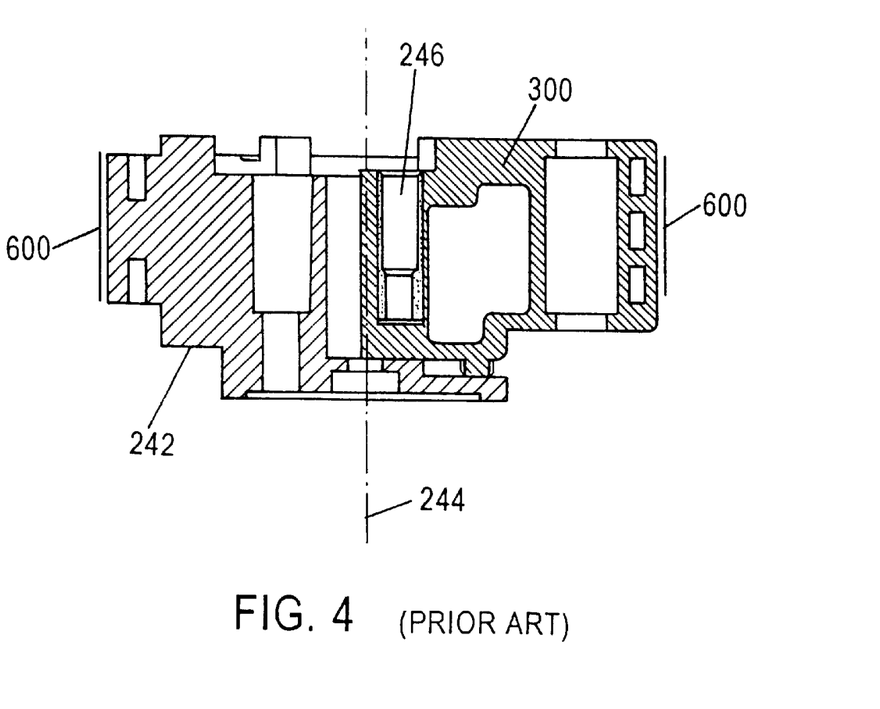

FIG. 4 is a cross-sectional view of the hub filler 300 partially ejected from the take-up reel 242. This figure also illustrates the misalignment of the axis 244 of the take-up reel 242 and the axle 246 of the hub filler 300.

There are some concerns regarding the conventional tape drive loading mechanism described above. After a hub filler has entered a take-up reel, the take-up reel is rotated by a motor to wrap tape around the take-up reel. However, there is a tendency for the hub filler to partially eject from the take-up reel during the initial rotation of the take-up reel. This ejection may be caused by the centrifugal force on the hub filler from the rotation of the take-up reel. The ejection may also be caused by other forces exerted on the hub filler, such as force from attached tape. After the initial wrapping of tape around the take-up reel, the position of the partially ejected hub filler in the take-up reel is relatively stable. This stability is a result of the force of the tape on the hub filler as the tape is wrapped around the take-up reel. This situation is the cause of several problems.

One problem is that the partially ejected hub filler disturbs the intended circumference portion of the take-up reel, around which the tape is intended to be wrapped. The hub filler is designed such that when the hub filler is properly positioned in the take-up reel, the circumference of the take-up reel is smooth all around. This smooth circumference preserves the integrity of tape that is wrapped around the take-up reel. A partially ejected hub filler disrupts this smooth circumference of the take-up reel and can damage tape wrapped around the take-up reel. This damage can be a bump or print formed on the tape from the portion of the hub filler that is protruding from the take-up reel. This bump or print is undesirable, as it will distort the quality of the data stored on the tape where the bump or print is formed. Also, the bump or print may deteriorate the mechanical strength of the tape and may eventually result in tape breakage.

Another concern related to a partially ejected hub filler from a take-up reel is the possibility that, as tape is progressively wrapped around the take-up reel, the pressure from tape on the hub filler will force the hub filler into the take-up reel. This is a problem because the hub filler is in a locked position after the initial wrapping of tape around the take-up reel. This forcing of the hub filler into the take-up reel puts mechanical stress on the tape near where the end of tape is attached to the hub filler. Accordingly, the tape may either be stretched or broken during this forced insertion of the hub filler into the take-up reel. As tape is progressively wrapped around a take-up reel, the pressure on the initially wrapped tape is also progressively increased. This pressure on the tape leads to stretching or breakage of the tape and distorts the stretched portion of the tape. There is also the possibility that the stretching of the tape will cause the tape to break or collapse. All of these types of damages to wrapped tape are undesirable and compromise the reliability of a tape drive.

Another concern relates to the alignment of a hub filler's axle and a take-up reel axis. Misalignment can cause minor imbalances during rotation of the take-up reel; these minor imbalances can create small speed variations in the tape wind and unwind speeds. These variations in speed are difficult for the motors of the take-up reel and cartridge reel to compensate for. Hence, the variations in speed deter from the quality of the reading and writing of the tape at the read/write head. Additionally, misalignment of the hub filler axis and the take-up reel axis reduce the life of the bearings in the take-up reel. Worn bearings will produce vibrations and result in noise during recording and reading at the read/write head. A partially ejected hub filler from the take-up reel can cause such a misalignment and therefore result in a tape drive being unreliable.

SUMMARY OF THE INVENTION

There is a need for a tape drive loading mechanism that can releaseably attach a hub filler to a take-up reel. There is also a need to prevent the unintended ejection of the hub filler from the take-up reel to prevent damage to tape wrapped around the take-up reel. There is also a need for prevention of this unintended ejection causing damage to the tape drive.

These and other needs are met by embodiments of the present invention, which provide means for controllably and releaseably attaching a hub filler to a take-up reel during loading of tape from a tape cartridge to a take-up reel. In certain embodiments, an attachment mechanism is provided between the take-up reel and the hub filler. The hub filler can be controllably and releaseably attached to the take-up reel to prevent the ejection of the hub filler from the take-up reel during the period of operation when the tape is being initially wrapped around the circumference of the take-up reel. Specifically, the present invention may utilize magnetic force or mechanical force to attach the hub filler to the take-up reel.

One of the advantages of certain embodiments of the present invention is the substantial prevention of the partial ejection of the hub filler from the take-up reel during the initial wrapping of tape around the take-up reel. This prevents unnecessary damage to the tape and tape drive mechanism. Specifically, if a hub filler is correctly attached to the take-up reel, the circumference of the take-up reel will be smooth during the initial wrapping of tape. As the circumference of the take-up reel is smooth, it is unlikely that a bump or print will be formed on the tape, which would result from a hub filler partially ejected from a take-up reel. Additionally, the tape drive mechanism of the present invention mitigates the likelihood of the tape wrapped around a take-up reel breaking, stretching, or collapsing. This breaking, stretching, or collapsing is prevented because the hub filler of the present invention is not forced into the take-up reel of the present invention after the initial wrapping of the tape. The tape drive of the present invention also minimizes misalignment of the hub filler axle with the take-up reel axis, so as to prevent the mechanical wear resulting from continued operation of a misaligned hub filler.

The foregoing and other features, aspects, and advantages of the present invention will become more apparent from the following detailed description of the present invention, taken in conjunction with the accompanying drawings.

DETAILED DESCRIPTION OF THE INVENTION

The present invention relates to a method and apparatus for loading a take-up reel with tape from a single reel tape cartridge. The cartridge of the present invention is a single reel cartridge and it is necessary for the tape drive to load the end of the tape from the cartridge to the take-up reel. A hub filler, which is part of the tape drive, receives the end of the tape from the cartridge. After the hub filler has attached to the end of the tape in the cartridge, such as by attaching to a leader pin that is connected to the end of the tape, the hub filler moves along a guide rail pulling the tape out of the cartridge, across the read/write head, and to the take-up reel. The hub filler enters the take-up reel, with the tape attached, and brings the hub filler to the hub of the take-up reel. Upon the hub filler entering the take-up reel, it is releaseably attached to the take-up reel. At this stage the tape is connected to both the single reel of the cartridge and the take-up reel. The rotation of the two reels controls the movement of the tape across the read/write head and consequently, the reading of the tape. A guide arm moves the hub filler from the cartridge to the take-up reel and the hub filler pivots on an axle as it is driven by the guide arm.

Figure 5:
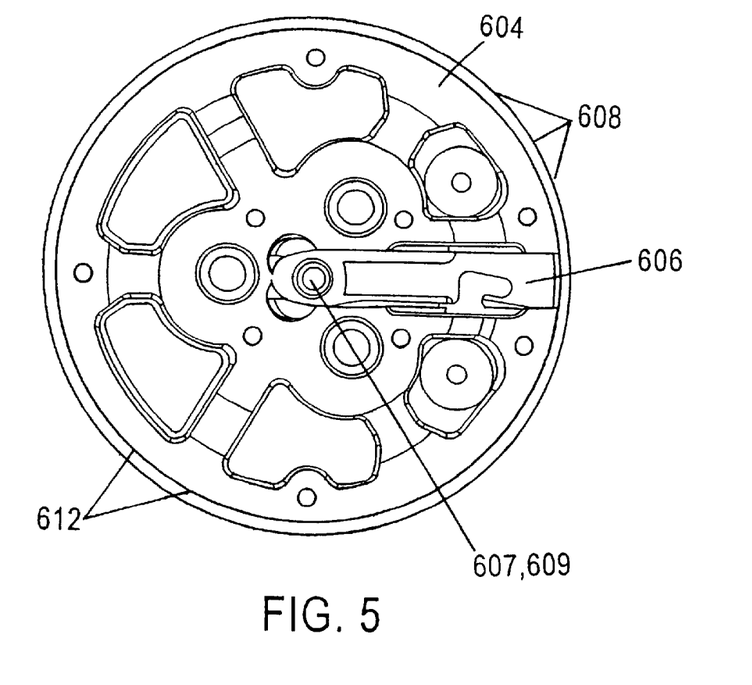
FIGS. 5 and 6a are views of a hub filler constructed in accordance with embodiments of the present invention, in a position releaseably attached to a take-up reel with tape wrapped on the circumference of the take-up reel.

FIG. 5 is a top view of a hub filler 606 and take-up reel 604 in accordance with embodiments of the present invention. This view shows the hub filler 606 securely attached to the take-up reel 604. When the hub filler 606 is securely attached to the take-up reel 604, the circumference 612 of the take-up reel 604 is continuous and smooth. This allows for tape 608 to be wrapped on the take-up reel 604 with minimal mechanical stress on the tape 608. This figure also shows that the axle 607 of the hub filler 606 is coincident with the axis 609 about which the hub filler 606 rotates. This reduces wear on the axle 607 during rotation of the take-up reel 604.

Figure 6A:
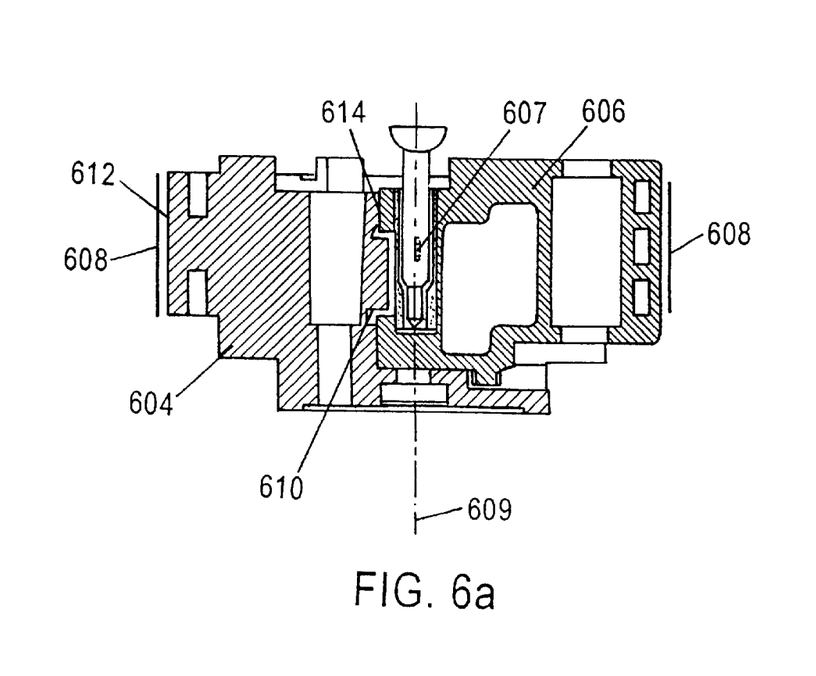
Figure 6B:
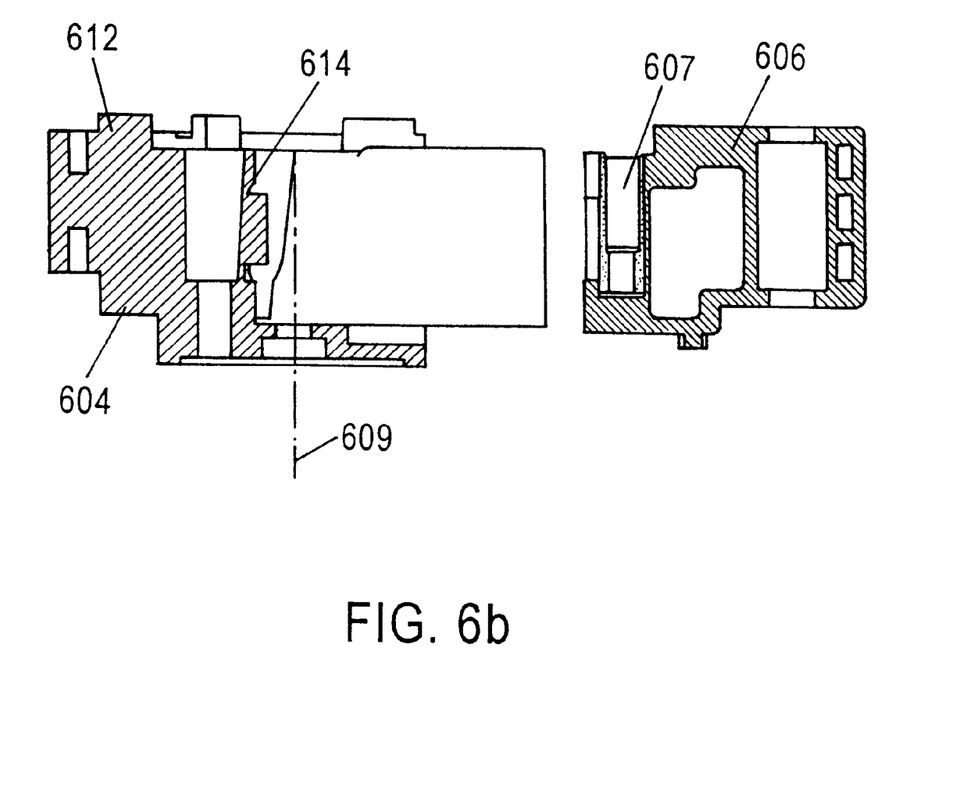
FIG. 6b is the hub filler and take-up reel of FIG. 6a, in a position separated from one another.

FIG. 6a is a cross-sectional view of the hub filler and tape-up reel arrangement of FIG. 5 showing additional details of the mechanism for attaching the hub filler 606 to the take-up reel 604. FIG. 6b is the hub filler 606 and take-up reel 604 of FIG. 6a, shown separated from one another. In embodiments of the present invention, the take-up reel comprises a magnet 610 for attaching the hub filler 606 to the take-up reel 604. In these embodiments, the hub filler 606 is made of metallic material or has a metallic portion that interacts with magnet 610. When the hub filler 606 enters the take-up reel 604, the metallic material or metallic portion of the hub filler 606 attaches to the magnet 610. This attachment (or latching) provides enough force to securely maintain the hub filler 606 in the take-up reel 604 during the initial wrapping of tape 608. However, this attachment is releasable and therefore does not prevent the ejection of the hub filler 606 from the take-up reel 604 during the unloading of tape from the tape drive. During the initial wrapping, the force between the magnet 610 and the metallic material of the hub filler 606 accommodates for the centrifugal forces of the rotation of the take-up reel 604 and the force on the hub filler 606 from the tape 608. When the hub filler 606 is fully inserted into the take-up reel 604, a portion of the hub filler 606 comes into direct contact with a portion of the take-up reel 604 at the seating face 614. The purpose of the seating face 614 is to accurately position the hub filler 606 in the take-up reel 604. In embodiments of the present invention, the magnet 610 may come into physical contact with the metallic material of the hub filler 606.

In other embodiments of the present invention, the magnet 610 may be positioned a short distance from the metallic material of the hub filler 606. This may be done to reduce the magnetic attraction between the hub filler 606 and the take-up reel 604 to allow for the anticipated ejection of the hub filler 606 from the take-up reel 604 during unloading of the tape 608. However, the magnetic attraction in this embodiment is configured to be strong enough to maintain the hub filler 606 in the take-up reel 604 during the initial wrapping of tape 608 on the take-up reel 604.

As discussed above, in certain embodiment the hub filler 606 is securely and releaseably attached to the take-up reel 604 using a magnet 610 on the take-up reel 604 for attachment to a metallic hub filler 606. However, there are other embodiments for secure, releaseable attachment of the hub filler to the take-up reel. For example, in certain embodiments of the present invention, a magnet may be provided on the hub filler to attach to metallic material of a take-up reel when the hub filler enters the take-up reel.

Figure 7:
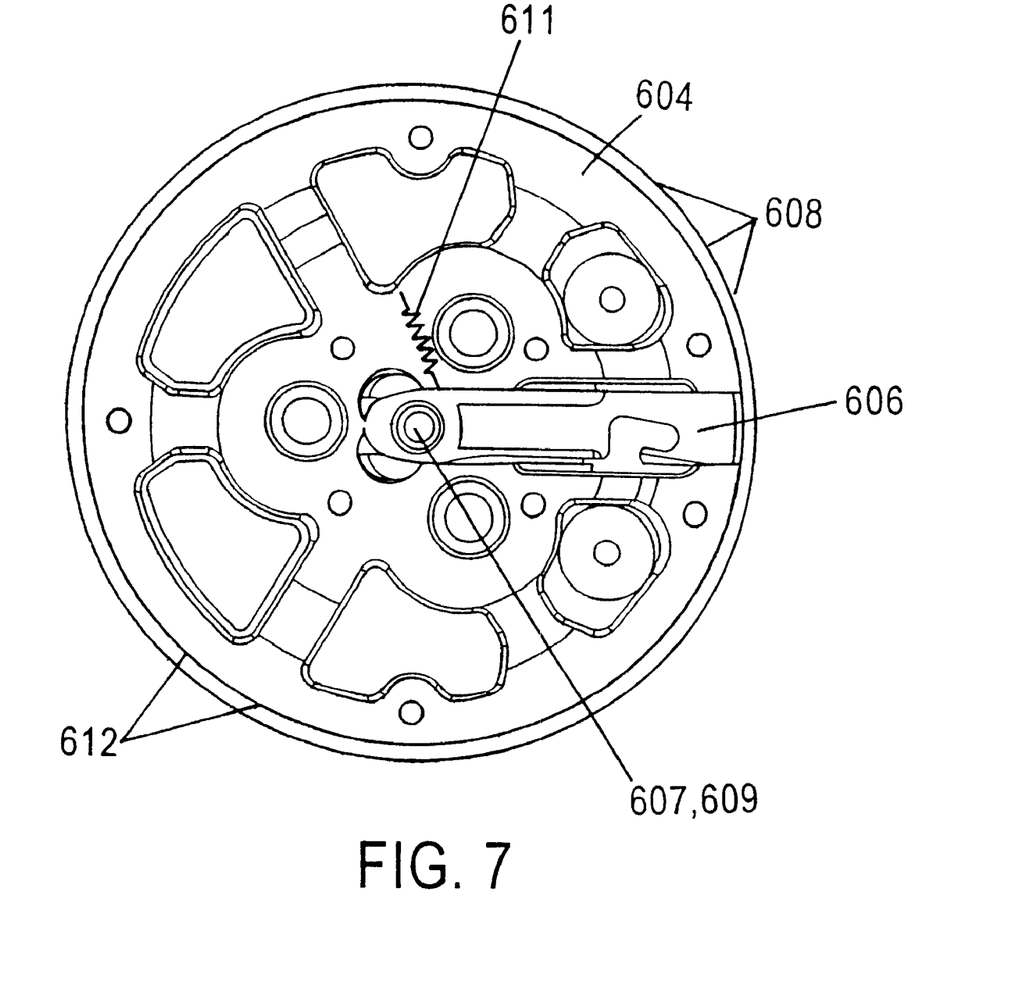
FIG. 7 is a view of a hub fuller releaseably attached to a take up reel with a mechanical coupling mechanism.

In still other embodiments of the present invention, such as that depicted in FIG. 7, a mechanical arrangement may be used for attaching the hub filler 606 to the take-up reel 604. These embodiments provide mechanical coupling between a portion of the hub filler 606 and the take-up reel 604. For example, an over-center spring 611 could be used. An over-center spring 611 is configured to apply a load to features of the hub filler to attach the hub filler to the take-up reel. The force applied would be enough to maintain the hub filler 606 in the take-up reel 604 during the initial wrapping of tape 608 around the take-up reel 604, but also allow for the hub filler 606 to be ejected from the take-up reel 604 during the unloading of the tape 608 from the tape drive.

One of ordinary skill in the art would recognize other arrangements for securely and releaseably attaching the hub filler to the take-up reel within the scope of the present invention. Such arrangements provide enough force to attach the hub filler to the take-up reel during initial wrapping of tape around the take-up reel, but also allow for the hub filler to be ejected from the take-up reel without damaging the wrapped tape. Accordingly, the force of attachment between the hub filler and the take-up reel should not be excessive to the point that tape attached to the hub filler is damaged during the intended ejection of the hub filler from the take-up reel during an unloading operation.

The present invention provides an improved method and apparatus for loading a tape from a single reel tape cartridge into a take-up reel. This is accomplished by securely and releaseably attaching the hub filler to the takeup reel upon the hub filler entering the take-up reel. This attachment provides enough attraction between the hub filler and the take-up reel for the tape to be wrapped around the take-up reel during loading of the tape without the hub filler partially ejecting from the take-up reel. By preventing the hub filler from partially ejecting from the take-up reel, damage to the tape and the tape drive loading mechanism is mitigated. The attachment of the hub filler to the take-up reel also provides for the anticipated detachment of the hub filler from the take-up reel during the unloading of the tape from the tape drive.

Although the present invention has been described and illustrated in detail, it is to be clearly understood that the same is by way of illustration and example only, and is not to be taken by way of limitation, the scope of the present invention being limited only by the terms of the appended claims.

What is claimed is:

1. A tape drive mechanism comprising:

a hub filler arranged to transport an end of a tape to and from a take-up reel; and means for releaseably attaching the hub filler to the take-up reel.

2. The tape drive mechanism of claim 1, wherein:

the means for releaseably attaching the hub filler to the take-up reel comprises at least a portion of the hub filler that comprises a metallic material, and at least a portion of the take-up reel that comprises a magnetic material, said magnetic material magnetically attracting said metallic material.

3. The tape drive mechanism of claim 1, further comprising:

a guide rail coupled to the hub filler and arranged to guide the movement of the hub filler to and from the take-up reel; and a guide arm coupled to the hub filler and arranged to drive movement of the hub filler to and from the take-up reel; and a guide arm motor coupled to the guide arm and arranged to drive movement of the guide arm.

4. The tape drive mechanism of claim 3, wherein the tape drive is configured to receive a removable tape cartridge.

5. The tape drive mechanism of claim 3, wherein the tape drive is configured to receive a single reel tape cartridge.

6. The tape drive mechanism of claim 1, wherein:

the hub filler is configured to attach to the end of a tape during a loading operation of the tape drive mechanism; and the hub filler is configured to detach from the end of the tape during an unloading operation of the tape drive mechanism.

7. The tape drive mechanism of claim 1, wherein:

the means for releaseably attaching the hub filler to the take-up reel comprises at least a portion of the take-up reel that comprises a metallic material, and at least a portion of the hub filler that comprises a magnetic material, said magnetic material magnetically attracting said metallic material.

8. The tape drive mechanism of claim 1, wherein the means for attaching the hub filler to the take-up reel comprises a mechanical coupling between a portion of the hub filler and a portion of the take-up reel.

9. The tape drive mechanism of claim 8, wherein the mechanical coupling comprises an over-center spring.

10. A method of loading tape onto a take-up reel of a tape drive, comprising the steps of:

attaching an end of a tape to a hub filler;

transporting the end of the tape to a take-up reel via the hub filler;

releaseably attaching the hub filler to the take-up reel.

11. The method of claim 10, wherein:

at least a portion of the hub filler comprises a metallic material;

at least a portion of the take-up reel comprises a magnetic material; and the step of releaseably attaching comprises magnetically attracting the metallic material of the hub filler to the magnetic material of the take-up reel.

12. The method of claim 10, wherein:

at least a portion of the hub filler comprises a magnetic material;

at least a portion of the take-up reel is comprises a metallic material; and the step of releaseably attaching comprises magnetically attracting the magnetic material of the hub filler to the metallic material of the take-up reel.

13. The method of claim 10, wherein the step of releaseably attaching utilizes an over-center spring.

14. The method of claim 10, wherein the step of releaseably attaching comprises magnetically attracting a portion of the hub filler to a portion of the take-up reel.

15. The method of claim 10, wherein the step of releaseably attaching comprises mechanically coupling a portion of the hub filler with a portion of the take-up reel.

16. The method of claim 10, wherein the tape drive is configured to receive a removable single reel tape cartridge.

17. A tape drive mechanism, comprising:

a take-up reel;

a hub filler; and a releaseable coupling configured to releaseably attach the hub filler to the take-up reel.

18. The tape drive mechanism of claim 17, wherein the releaseable coupling includes a magnetic coupling between the take-up reel and the hub filler.

19. The tape drive mechanism of claim 18, wherein the magnetic coupling includes a magnet mounted on at least one of the hub filler and the take-up reel.

20. The tape drive mechanism of claim 17, wherein the releaseable coupling includes a mechanical coupling on the take-up reel and the hub filler.

* * * * *